UNITED STATES PATENT OFFICE.

FREDERICK M. RUSCHHAUPT, OF NEW YORK, N. Y., ASSIGNOR TO JOHN G. KERSHAW, OF PHILADELPHIA, PENNSYLVANIA.

IMPROVEMENT IN THE MANUFACTURE OF ARTIFICIAL STONE.

Specification forming part of Letters Patent No. 40,984, dated December 15, 1863.

*To all whom it may concern:*

Be it known that I, FREDERICK M. RUSCHHAUPT, of the city and county of New York, State of New York, have invented an Improvement in the Manufacture of Artificial Stone; and I do hereby declare the following to be a full, clear, and exact description of the same.

The nature of my invention consists in manufacturing artificial stone from unslaked lime, clay, and gelatinous silicic acid mixed and pressed to the desired form, substantially as described hereinafter.

In the many processes hitherto practiced for making artificial stone the heating or baking of the composition has been deemed a necessary part of the operation.

One of the main objects of my invention has been to produce a tenacious stone, and one capable of resisting moisture, without resorting to the usual baking process, which demands the consumption of a costly amount of fuel. It has been thought that this could be accomplished by the use of silicate of potassa or soda in combination with lime and clay. Many experiments have been made with these materials without any successful results, owing to the fact that when alkaline silicates in solution are mixed with lime and clay the silicic acid will of course combine with the lime. As the alkali is then liberated, it remains in the mass, destroying by absorbing carbonic acid, water, &c., the cohesion of the particles, and thereby preventing the crystallization and adhesion to each other of the silicates of clay and lime. I overcome this difficulty by my invention, which I will now proceed to describe.

Silicate of soda or silicate of potassa is dissolved in water and a current of carbonic acid passed through the solution, thereby precipitating silicic acid. The gelatinous mass is then removed and washed with water to free it from the alkaline carbonates, after which it is mixed in proportions of one part, by weight, with three and a half parts of unslaked lime and seven and a half parts of burnt clay. The mass has to be quickly mixed and stirred, sufficient water being added to bring it to the consistency of thick paste, which is placed in molds and the latter subjected to powerful pressure, the pressure on the composition being retained for two or three hours, during which the assimilation of the particles takes place, and the stone being ready for use after a few days' exposure to the atmosphere.

No foreign absorbing substance is embodied in this artificial stone, all the water having been either pressed out of it or chemically combined with it. The quality of the stone depends upon that of the materials used, imitations of fine white marbles being produced by the use of materials of corresponding fineness and whiteness. Imitations of marble statuary and other marble ornaments can be cast from the composition, and are capable of receiving the highest polish. The stone can also be colored by introducing during the process of its manufacture different coloring-matters.

In preparing this artificial stone, sharp sand, broken pebble-stones, &c., can be introduced, and from this composition building-stones may be prepared, as well as columns and other forms. When powdered coal-dust is mixed with about ten per cent. of lime and two per cent. of gelatinous silicic acid and subjected to powerful pressure, an excellent stone-coal is produced, and may be made in forms especially applicable for packing and transportation, and for use in steamboats. The carbonate of soda which is separated during the precipitation of the gelatinous silica may be used over and over again for the preparation of the silicate.

I claim as my invention and desire to secure by Letters Patent—

The manufacture of artificial stone from lime, clay, and gelatinous silicic acid mixed and pressed, substantially as set forth, for the purpose specified.

In testimony whereof I have signed my name to this specification in the presence of two subscribing witnesses.

FR. M. RUSCHHAUPT.

Witnesses:
JESSE B. ROGERS,
THEOPHILUS FISKE.